(12) United States Patent
Fujibayashi et al.

(10) Patent No.: US 8,328,364 B2
(45) Date of Patent: Dec. 11, 2012

(54) PROJECTION DISPLAY APPARATUS COMPRISING A LOUVER WITH INCLINED AND NON-INCLINED PORTIONS

(75) Inventors: Hiroko Fujibayashi, Aichi (JP);
Hiroyuki Meguro, Shizuoka (JP);
Kazuhiro Takai, Aichi (JP)

(73) Assignees: Sony Corporation, Tokyo (JP); Sony Mobile Communications Japan, Inc., Tokyo (JP)

( * ) Notice: Subject to any disclaimer, the term of this patent is extended or adjusted under 35 U.S.C. 154(b) by 472 days.

(21) Appl. No.: 12/621,707

(22) Filed: Nov. 19, 2009

(65) Prior Publication Data

US 2010/0123877 A1 May 20, 2010

(30) Foreign Application Priority Data

Nov. 20, 2008 (JP) .................................. P2008-296513

(51) Int. Cl.
*G03B 21/18* (2006.01)
*G03B 21/16* (2006.01)

(52) U.S. Cl. .............................. 353/61; 353/57; 362/264

(58) Field of Classification Search .................... 353/52, 353/57, 58, 59, 60, 63, 61; 362/294
See application file for complete search history.

(56) References Cited

U.S. PATENT DOCUMENTS

| 2005/0213050 A1* | 9/2005 | Suzuki ............................. 353/58 |
| 2006/0157233 A1* | 7/2006 | Ozaki et al. .................... 165/152 |
| 2007/0115438 A1* | 5/2007 | Tsubura .......................... 353/57 |

FOREIGN PATENT DOCUMENTS

| JP | 2005 10494 | 1/2005 |
| JP | 2005 25035 | 1/2005 |
| JP | 2005 242156 | 9/2005 |

\* cited by examiner

*Primary Examiner* — Francis M Legasse, Jr.
(74) *Attorney, Agent, or Firm* — Frommer Lawrence & Haug LLP; William S. Frommer; Thomas F. Presson (57) ABSTRACT

A projection display apparatus includes an axial fan and a louver. The axial fan includes blades which are rotated to generate an airflow in an axial direction so that air is exhausted from a housing. The louver includes inclined plate portions which are inclined with respect to the axial direction, the inclined plate portions being arranged in a direction perpendicular to the axial direction at an airflow exit side of the axial fan, the louver being divided into a first area and a second area by a straight line which passes through an axial center of the blades, the inclined plate portions being inclined in different directions between the first area and the second area such that the inclined plate portions are inclined along the direction in which the blades are rotated.

4 Claims, 7 Drawing Sheets

RELATIONSHIP BETWEEN FREQUENCY AND NOISE

| FREQUENCY Hz | CONDITION 1 | CONDITION 2 | CONDITION 3 |
|---|---|---|---|
| 31.5 | 4.3 | 4.6 | 4.9 |
| 63 | 5.2 | 4.4 | 4.6 |
| 125 | 2.7 | | |
| 250 | 15.1 | 10.9 | 10.9 |
| 500 | 17.3 | 14.7 | 16 |
| 1000 | 20.4 | 18.8 | 17 |
| 2000 | 19.1 | 18.4 | 17 |
| 4000 | 16.2 | 14.7 | 13.7 |
| 8000 | 16.8 | 14.5 | 14 |
| APW | 26 | 24.2 | 23.4 |

NOISE (dB)

PROJECTION DISPLAY APPARATUS COMPRISING A LOUVER WITH INCLINED AND NON-INCLINED PORTIONS

BACKGROUND OF THE INVENTION

1. Field of the Invention

The present invention relates to a projection display apparatus which projects and displays an image on a screen.

2. Description of the Related Art

In recent years, liquid crystal projector apparatuses have been widely used as projection display apparatuses which project and display images. In an example of a liquid crystal projector apparatus, light is emitted from a light source and is modulated by a liquid crystal panel to form an optical image corresponding to an image signal. The thus-obtained optical image is magnified by a projector lens and is displayed on a screen.

A plurality of heat sources, such as the light source and electronic circuit components, are disposed in a housing of the liquid crystal projector apparatus. Therefore, the liquid crystal projector apparatus generally includes a cooling structure which exhausts air from the housing by using an axial fan disposed in the housing.

With regard to the cooling structure for the liquid crystal projector apparatus, various techniques have been proposed. For example, Japanese Unexamined Patent Application Publications Nos. 2005-242156 and 2005-25035 disclose a structure in which a louver which covers an exhaust side of the axial fan is provided with blade members having inclined portions so that an airflow resistance can be reduced and leakage of light from the housing can be reliably prevented. As another example, Japanese Unexamined Patent Application Publications No. 2005-10494 discloses a structure in which a louver is provided with exhaust-straightening walls which are arranged in a pattern of concentric circles or in a radial pattern with respect to the rotational center of the axial fan.

SUMMARY OF THE INVENTION

However, the cooling structures according to the above-mentioned publications have the following problems. For example, according to the technique described in Japanese Unexamined Patent Application Publications Nos. 2005-242156 and 2005-25035, the blade members are inclined in the same direction over the entire area of the louver. Therefore, an area exists in which the inclination direction does not match the rotational direction of the axial fan, more specifically, the direction of an airflow generated by the axial fan. It is difficult to reduce the airflow resistance in such an area, and there is a risk that the amount of flow of the exhaust air will be reduced or noise will be increased. According to the technique described in Japanese Unexamined Patent Application Publication No. 2005-10494, the reduction in the amount of flow of the exhaust air and the increase in noise can be prevented. However, since the exhaust-straightening walls of the louver are arranged in a pattern of concentric circles or in a radial pattern with respect to the rotational center of the axial fan, the process of forming the louver is not simple and versatility in the design of the external shape of the louver is low.

Therefore, it is desirable to provide a projection display apparatus including a louver which has a shape such that the louver can be easily formed and which is designed in consideration of a rotational direction of an axial fan so that the airflow resistance can be reliably reduced and the reduction in the amount of airflow and the increase in noise can be reliably prevented.

A projection display apparatus according to an embodiment of the present invention includes an axial fan and a louver. The axial fan includes blades which are rotated to generate an airflow in an axial direction so that air is exhausted from a housing. A louver includes inclined plate portions which are inclined with respect to the axial direction, the inclined plate portions being arranged in a direction perpendicular to the axial direction at an airflow exit side of the axial fan, the louver being divided into a first area and a second area by a straight line which passes through an axial center of the blades, the inclined plate portions being inclined in different directions between the first area and the second area such that the inclined plate portions are inclined along the direction in which the blades are rotated.

In the projection display apparatus having the above-described structure, the inclined plate portions are inclined in different directions between the first area and the second area. Therefore, unlike the case in which the inclined plate portions are inclined in the same direction over the entire area of the louver, in each of the first and second areas, the inclination direction of the inclined plate portions matches the rotational direction of the blades of the exhaust fan, that is, the direction of the airflow generated by the blades. To match the inclination direction with the direction of the airflow, the louver is divided into the first and second areas along the straight line which passes through the axial center of the blades. Thus, the louver is simply divided into two areas, for example, into left and right areas or upper and lower areas across the straight line. Therefore, the number of areas into which the louver is divided can be prevented from being excessively increased. In addition, the shape of the inclined plate portions can be prevented from becoming complex in the entire area of the louver.

According to the embodiment of the present invention, the inclination direction of the inclined plate portions matches the direction in which the blades of the exhaust fan are rotated in each of the areas. Therefore, compared to the case in which the inclined plate portions are inclined in the same direction over the entire area of the louver, the resistance applied to the airflow generated by the axial fan can be reliably reduced when the airflow passes through the louver. Therefore, the amount of airflow for exhausting the air from the housing with the axial fan can be prevented from being reduced, and the noise can be reduced by reducing the resistance to the airflow. In addition, the louver can be formed without making the shape of the louver more complex than necessary. Therefore, compared to the case in which the exhaust-straightening walls are arranged in a pattern of concentric circles or in a radial pattern with respect to the rotational center of the axial fan, the louver can be easily formed. In addition, since the external shape of the louver can be prevented from becoming complex, the freedom and versatility in the design of the external shape can be ensured.

DESCRIPTION OF THE PREFERRED EMBODIMENT

A projection display apparatus according to an embodiment of the present invention will be described below with reference to the accompanying drawings.

Here, a liquid crystal projector apparatus will be described as an example of a projection display apparatus. In the liquid crystal projector apparatus, light is emitted from a light source, such as a high-pressure mercury lamp, and is modulated by a liquid crystal display device to form an optical image corresponding to a video signal. The thus-obtained optical image is magnified by a projector lens and is displayed on a screen. A so-called three-panel liquid crystal projector apparatus including three panel-type liquid crystal display devices for respective colors, which are red (R), green (G), and blue (B), is widely used as a liquid crystal projector apparatus. In the following descriptions, the panel-type liquid crystal display devices are simply referred to as "liquid crystal panels."

Schematic Structure of Projection Display Apparatus

Figure 1:
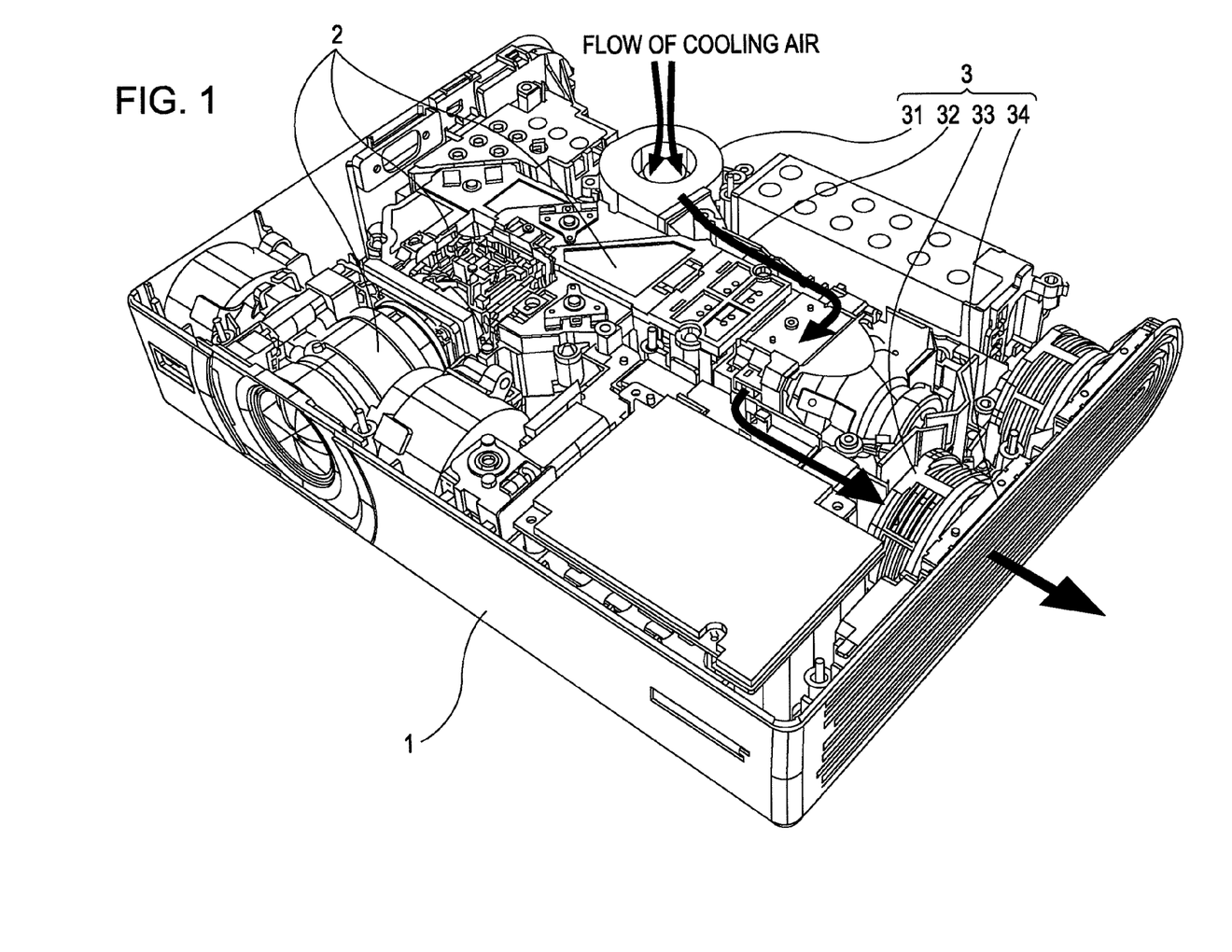
FIG. 1 is a diagram illustrating the schematic structure of a liquid crystal projector apparatus.

FIG. 1 is a diagram illustrating the schematic structure of a liquid crystal projector apparatus.

As shown in FIG. 1, the liquid crystal projector apparatus includes an optical system unit 2 and an air cooling unit 3 disposed in a housing 1 of the liquid crystal projector apparatus.

The optical system unit 2 projects and displays a color image on a screen.

The air cooling unit 3 mainly cools the optical system unit 2. In addition to the optical system unit 2, the air cooling unit 3 may also cool electronic components disposed in the housing 1. The electronic components are, for example, electronic circuit components for driving liquid crystal panels included in the optical system unit 2.

These units 2 and 3 will now be described.

Schematic Structure of Optical System Unit

Figure 2:
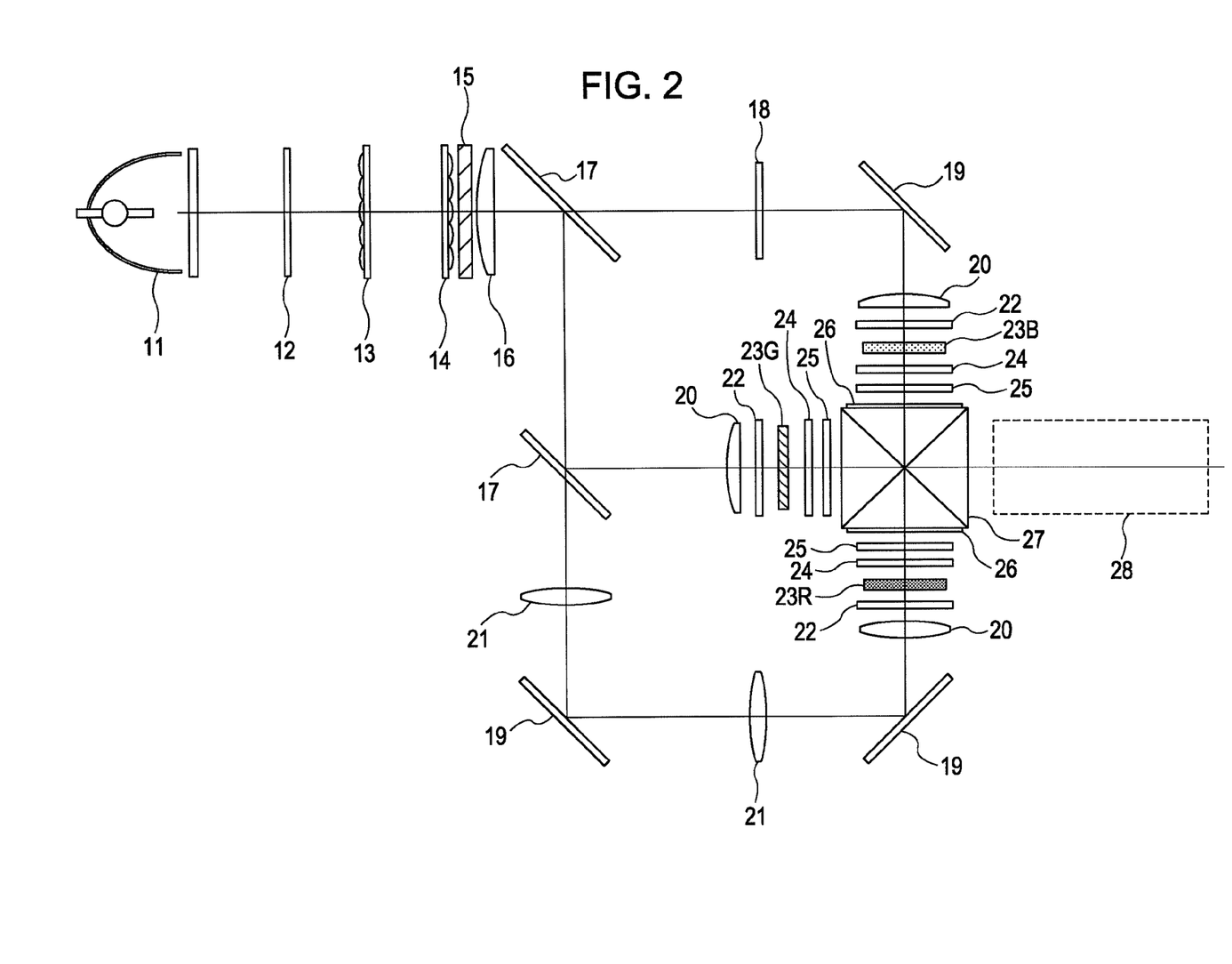
FIG. 2 is a diagram illustrating an example of the structure of an optical system unit included in a three-plate liquid crystal projector apparatus.

FIG. 2 is a diagram illustrating an example of the structure of the optical unit 2 included in the three-plate liquid crystal projector apparatus. In FIG. 2, the optical system unit 2 of the liquid crystal projector apparatus includes transmissive liquid crystal panels.

In the optical system unit 2 shown in FIG. 2, light emitted from a light source 11 passes through a filter 12 which cuts infrared rays and ultraviolet rays, a first fly-eye lens 13, a second fly-eye lens 14, a polarization conversion element 15, and a condenser lens 16. Then, the light is divided into R, G, and B color light components by dichroic mirrors 17 which each reflect only light in a specific wavelength band. The R, G, and B color light components are guided through an ultraviolet absorbing filter 18, total reflection mirrors 19, condenser lenses 20, relay lenses 21, etc., as necessary and are incident on liquid crystal panels 23R, 23G, and 23B corresponding to the respective colors R, G, and B. Each of the liquid crystal panels 23R, 23G, and 23B is provided with an incident-side polarizing plate 22, an optical compensating plate 24, and an exit-side polarizing plate 25. The color light components pass through the respective incident-side polarizing plates 22 and are incident on the respective liquid crystal panels 23R, 23G, and 23B, which modulates the color light components. The thus-modulated color light components pass through the respective optical compensating plates 24 and the respective exit-side polarizing plates 25. After the color light components are modulated by the liquid crystal panels 23R, 23G, and 23B in accordance with the video signal, the modulated color light components are guided through half wavelength films 26 as necessary and are combined by a dichroic prism 27. Then, the combined light is magnified and projected onto the screen by a projector lens 28. Thus, the optical system unit 2 projects and displays a color image on the screen.

Figure 3:
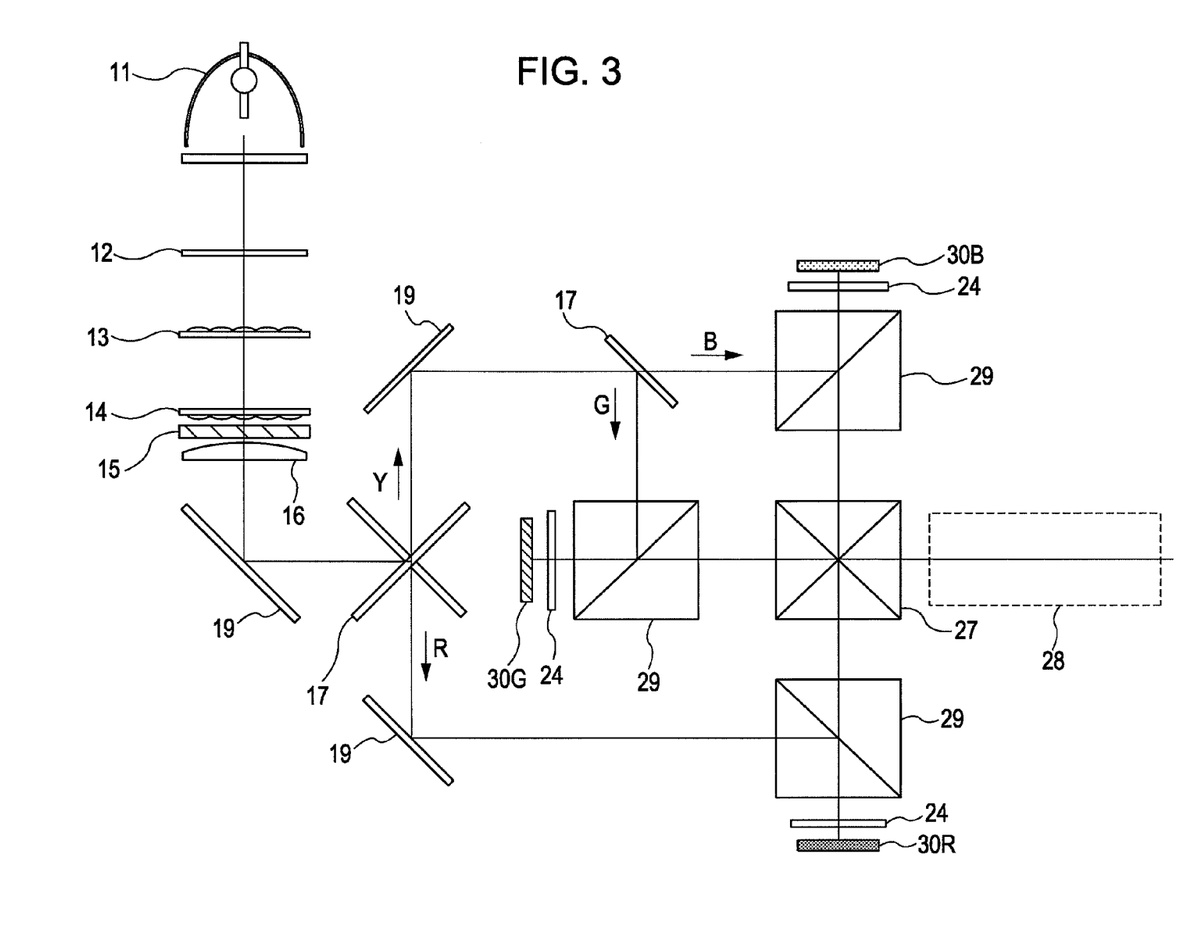
FIG. 3 is a diagram illustrating another example of the structure of an optical system unit included in a three-plate liquid crystal projector apparatus.

FIG. 3 is a diagram illustrating another example of the structure of the optical system unit 2. In FIG. 3, the optical system unit 2 of the liquid crystal projector apparatus includes reflective liquid crystal panels.

Similar to the case in which the transmissive liquid crystal panels are used (see FIG. 2), in the optical system unit 2 shown in FIG. 3, light emitted from a light source 11 passes through a filter 12, a first fly-eye lens 13, a second fly-eye lens 14, a polarization conversion element 15, and a condenser lens 16. Then, the light is divided into R, G, and B color light components by dichroic mirrors 17. Then, the R, G, and B color light components are guided through total reflection mirrors 19, polarizing beam splitters (PBS) 29, and quarter-wave plates 24 as necessary and are incident on reflective liquid crystal panels 30R, 30G, and 30B corresponding to the respective colors R, G, and B. Then, the color light components are modulated by the reflective liquid crystal panels 30R, 30G, and 30B in accordance with the video signal, and the modulated color light components are combined by a dichroic prism 27. Then, the combined light is magnified and projected onto the screen by a projector lens 28. Thus, the optical system unit 2 displays a color image on the screen.

Schematic Structure of Air Cooling Unit

As shown in FIG. 1, the air cooling unit 3 includes an intake fan 31, a fan duct 32, an exhaust fan 33, and a louver 34.

The intake fan 31 is composed of, for example, a sirocco fan, and air is introduced into the housing 1 from the outside and is guided toward the optical system unit 2.

The fan duct 32 guides the air from the intake fan 31 toward the position where the optical system unit 2 is disposed, and then guides the air that has passed through the position where the optical system unit 2 is disposed to the exhaust fan 33.

Each exhaust fan 33 is composed of an axial fan having rotating blades, and generates an airflow in an axial direction by rotating the blades. Thus, the air guided through the fan duct 32 in the housing 1 is exhausted from the housing 1.

The louver 34 includes a plurality of plate-shaped members called slats which are arranged parallel to each other, and is disposed so as to cover the exhaust fans 33 at airflow exit sides of the exhaust fans 33. The louver 34 is formed as a portion of the housing 1.

In the air cooling unit 3 having the above-described structure, when the air is introduced into the housing 1 by the intake fan 31, the fan duct 32 guides the air from the intake fan 31 toward the position where the optical system unit 2 is disposed. Then, heat-exchange occurs at the position where the optical system unit 2 is disposed. After the heat exchange, the air is exhausted from the housing 1 by the exhaust fans 33. Thus, the air cooling unit 3 cools the inside of the housing 1 by generating the airflow.

In the above-described cooling structure, the louver 34 is disposed at the airflow exit side of the exhaust fans 33. The louver 34 functions as an exhaust outlet through which the air is exhausted from the housing 1 after the heat exchange. The louver 34 also functions as a member for preventing foreign matter from entering the housing 1. In addition, the louver 34 also functions as a blocking member for preventing leakage of light emitted by the light source 11 in the optical system unit 2 from the housing 1.

The object to be cooled by the air cooling unit 3 and the arrangement of the air cooling unit 3 in the housing 1 are not particularly limited as long as the air cooling unit 3 includes at least the exhaust fans 33 and the louver 34 and has a cooling structure which prevents the temperature in the housing 1 from being increased by exhausting the air in the housing 1.

Structure of Main Part of Air Cooling Unit

The characteristic structure of the air cooling unit 3 having the above-described structure will be further described in detail.

More specifically, the louver 34 included in the air cooling unit 3 according to the present embodiment has a characteristic structure.

Figure 4A:
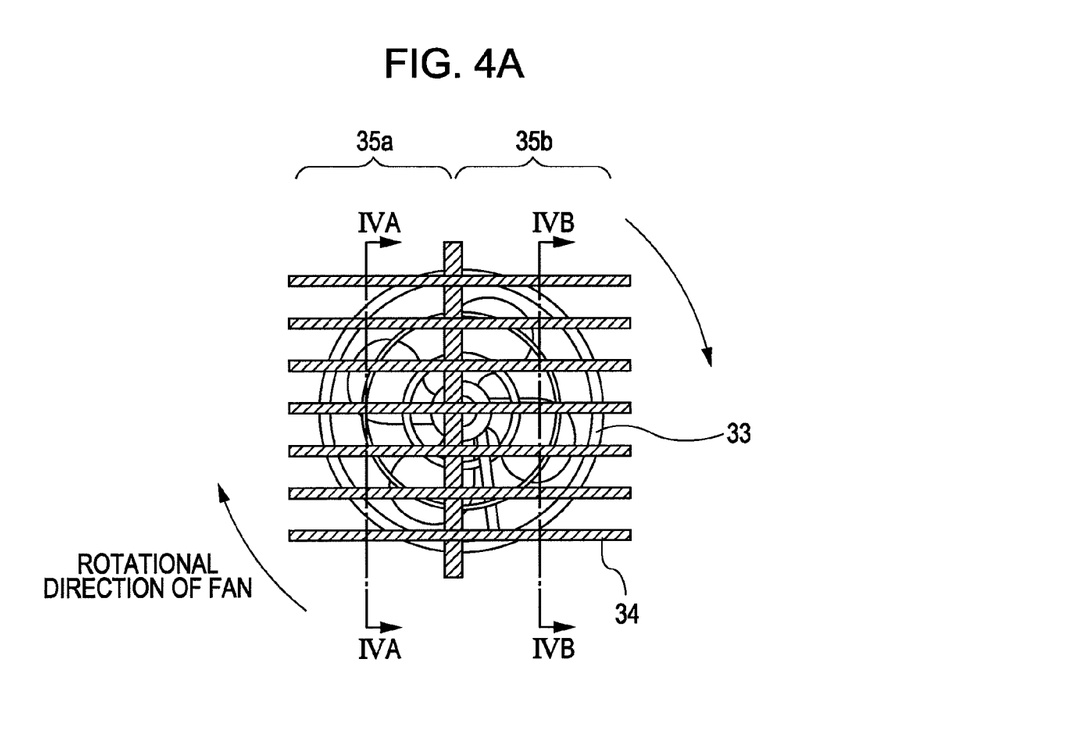
FIGS. 4A to 4C are diagrams illustrating the structure of a characteristic part of a liquid crystal projector apparatus according to an embodiment of the present invention.
Figure 4B:
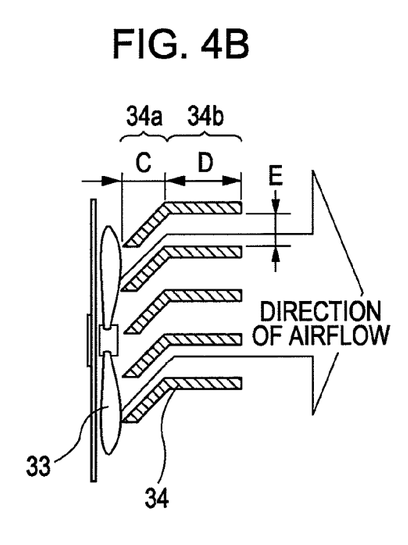
Figure 4C:
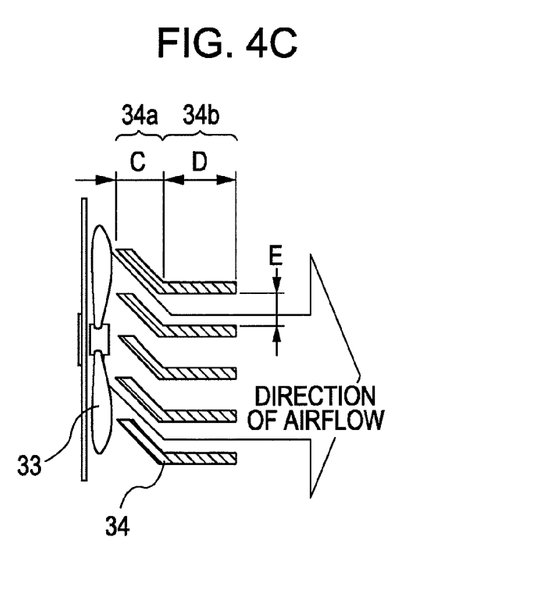

FIGS. 4A to 4C are diagrams illustrating the structure of the characteristic part of the liquid crystal projector apparatus according to the present embodiment.

As shown in FIG. 4A, the louver 34 covers the airflow exit side of each exhaust fan 33, and a plane area of the louver 34 which overlaps the exhaust fan 33 when viewed from the airflow exit side is divided into a first area 35a and a second area 35b by a straight line (hereinafter referred to as a boundary line) which passes through the axial center of the blades of the exhaust fan 33. In FIG. 4A, the plane area is divided into the first area 35a and the second area 35b in the left-right direction by the boundary line which extends in the vertical direction.

The plane area is divided for each of the exhaust fans 33 individually. In the case where a plurality of exhaust fans 33 are provided, each of the plane areas corresponding to the exhaust fans 33 is divided into the first area 35a and the second area 35b.

Although the case in which the first and second areas are divided from each other in the left-right direction is described herein, the direction in which the plan area is divided is not limited to the left-right direction. For example, the plane area can also be divided into upper and lower areas by a boundary line which extends in the left-right direction.

The louver 34 includes a plurality of slats which are arranged parallel to each other. As shown in FIGS. 4B and 4C, each slat includes an inclined plate portion 34a and a non-inclined plate portion 34b in a cross section taken along the direction in which the boundary line extends.

The inclined plate portions 34a are inclined with respect to the rotational axis direction of the blades of the exhaust fan 33.

The non-inclined plate portions 34b extend substantially parallel to the rotational axis direction of the blades of the exhaust fan 33 instead of being inclined with respect to the rotational axis direction.

In each slat, the inclined plate portion 34a and the non-inclined plate portion 34b are connected to each other such that the inclined plate portion 34a is positioned near the exhaust fan 33 and the non-inclined plate portion 34b is positioned near the outside of the housing 1. The louver 34 is formed by arranging the slats, which each include the inclined plate portion 34a and the non-inclined plate portion 34b, in a direction perpendicular to the rotational axis direction of the blades of the exhaust fan 33.

In the cross section of the louver 34 taken along the direction in which the boundary line extends, the slats, each of which is obtained by connecting the non-inclined plate portion 34b to an end of the inclined plate portion 34a at the airflow exit side thereof, are arranged in the direction perpendicular to the rotational axis direction of the exhaust fan 33 (in the vertical direction in FIGS. 4A to 4C).

Intervals (E in FIGS. 4B and 4C) between the slats, which each include the inclined plate portion 34a and the non-inclined plate portion 34b, in the direction perpendicular to the rotational axis direction of the exhaust fan 33 are determined such that the louver 34 can function as an exhaust outlet for the airflow generated by the exhaust fan 33 and also as a member for preventing the entrance of foreign matter. More specifically, the intervals between the slats are set to be large enough to ensure the function as the exhaust outlet through which the airflow can be exhausted without being blocked, but small enough to prevent the finger of a user or the like from being inserted. For example, in the case where the thickness of the slats is about 1 mm to 2 mm, the intervals between the slats may be set to about 3 mm to 5 mm.

The inclination angle of the inclined plate portions 34a of the slats may be set to a suitable angle such that the inclined plate portions 34a do not serve as a resistance against the airflow generated by the exhaust fan 33 and such that the inclined plate portions 34a can be easily formed. More specifically, the inclination angle of the inclined plate portions 34a with respect to the rotational axis direction of the blades of the exhaust fan 33 is in the range of, for example, 30° to 45°. The inclination angle of the non-inclined plate portions 34b of the slats with respect to the rotational axis direction of the blades is, of course, 0°.

The sizes of the inclined plate portions 34a and the non-inclined plate portions 34b are set such that the strength (rigidity) of the slats can be ensured and the leakage of light from the housing 1 can be prevented. Thus, the inclination angle of the inclined plate portions 34a, the dimensions (C and D in FIGS. 4B and 4C) of the inclined plate portions 34a and the non-inclined plate portions 34b in the rotational axis direction of the exhaust fan 33, and the intervals (E in FIGS. 4B and 4C) between the slats arranged in the direction perpendicular to the rotational axis direction are set such that the strength can be ensured and light leakage can be prevented. More specifically, in the case where, for example, the inclination angle of the inclined plate portions 34a is in the range of 30° to 45° and the intervals (E in FIGS. 4B and 4C) between the slats are in the range of 3 mm to 5 mm, the dimension (C in FIGS. 4B and 4C) of the inclined plate portions 34a in the rotational axis directions may be set to about 1.5 mm and the dimension (D in FIGS. 4B and 4C) of the non-inclined plate portions 34b in the rotational axis direction may be set to about 2 mm.

As described above, the plane area of the louver 34 is divided into the first area 35a and the second area 35b. The first area 35a and the second area 35b are divided from each other along the boundary line which passes through the axial center of the blades of the exhaust fan 33. Therefore, the direction in which the blades of the exhaust fan 33 move differs between the first area 35a and the second area 35b. As shown in FIG. 4A, in the case where, for example, the blades of the exhaust fan 33 rotate clockwise, the blades mainly move upward from a lower section in the first area 35a and downward from an upper section in the second area 35b.

Therefore, the inclination direction in which the inclined plate portions 34a are inclined differ between the first area 35a and the second area 35b of the louver 34 so that the inclination direction matches the rotational direction of the blades of the exhaust fan 33.

More specifically, in the first area 35a, as shown in FIG. 4B, the inclined plate portions 34a are inclined upward from the lower section along the direction of the airflow in accordance with the direction in which the blades of the exhaust fan 33 are moved. In addition, the non-inclined plate portions 34b, which are not inclined, are connected to the ends of the inclined plate portions 34a at the airflow exit side thereof.

In addition, in the second area 35b, as shown in FIG. 4C, the inclined plate portions 34a are inclined downward from the upper section in a direction opposite to that in the first area 35a along the direction of the airflow in accordance with the direction in which the blades of the exhaust fan 33 are moved. In addition, the non-inclined plate portions 34b, which are not inclined, are connected to the ends of the inclined plate portions 34a at the airflow exit side thereof.

Thus, the inclined plate portions 34a are inclined in the opposite directions, that is, in directions opposite to each other between the first area 35a and the second area 35b across the direction in which the non-inclined plate portions 34b extend.

The air cooling unit 3 including the louver 34 having the above-described structure provides the following effects.

As described above, the inclined plate portions 34a of the louver 34 are inclined in different directions between the first area 35a and the second area 35b. Therefore, unlike the case in which the inclined plate portions are inclined in the same direction over the entire area of the louver, the inclination direction of the inclined plate portions 34a matches the rotational direction of the blades of the exhaust fan 33, that is, the direction of the airflow generated by the blades in each of the areas 35a and 35b. As a result, compared to the case in which the inclined plate portions are inclined in the same direction over the entire area of the louver, the resistance applied to the airflow generated by the exhaust fan 33 can be reliably reduced when the airflow passes through the louver 34.

Thus, in the air cooling unit 3 including the louver 34 having the above-described structure, the resistance to the passage of the airflow through the louver 34 is reduced. As a result, reduction in the amount of airflow can be prevented when the air in the housing 1 is exhausted by the exhaust fan 33. In addition, noise can be reduced by reducing the resistance to the airflow.

Here, an example of the noise reducing function will be described.

Figure 5A:
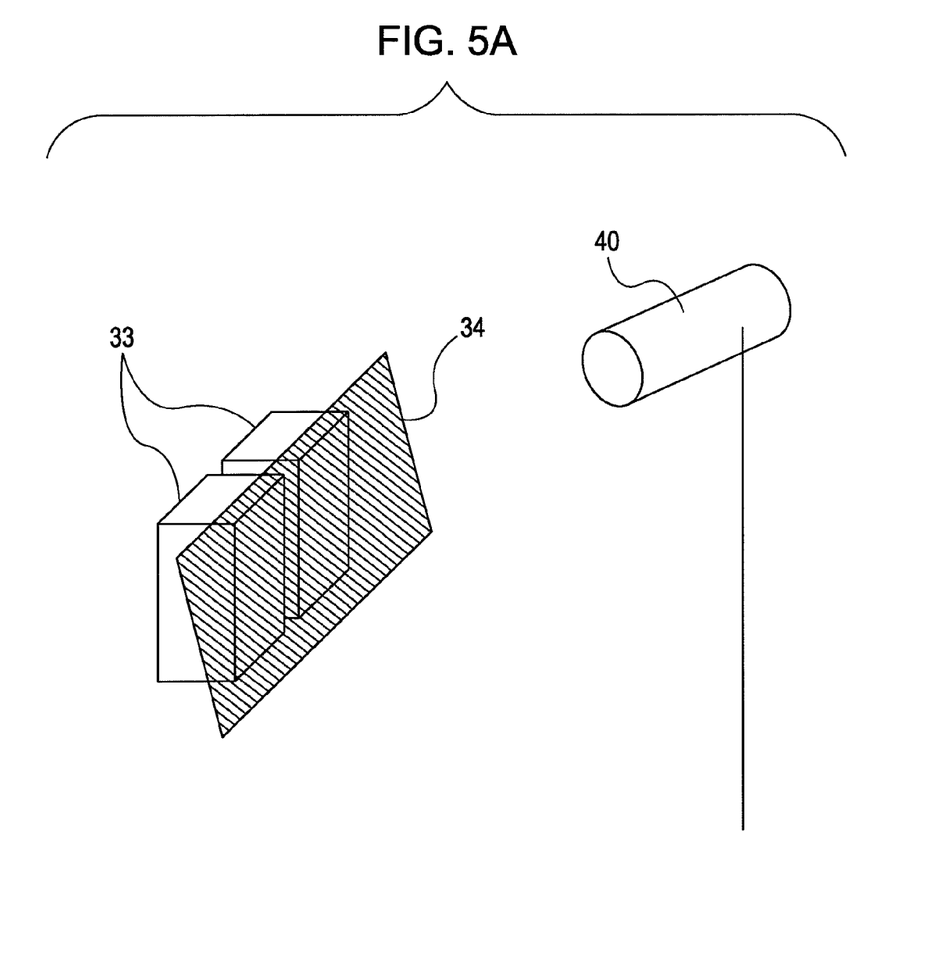
FIGS. 5A to 5C are diagrams illustrating an example of the result of noise measurement.
Figure 5B:
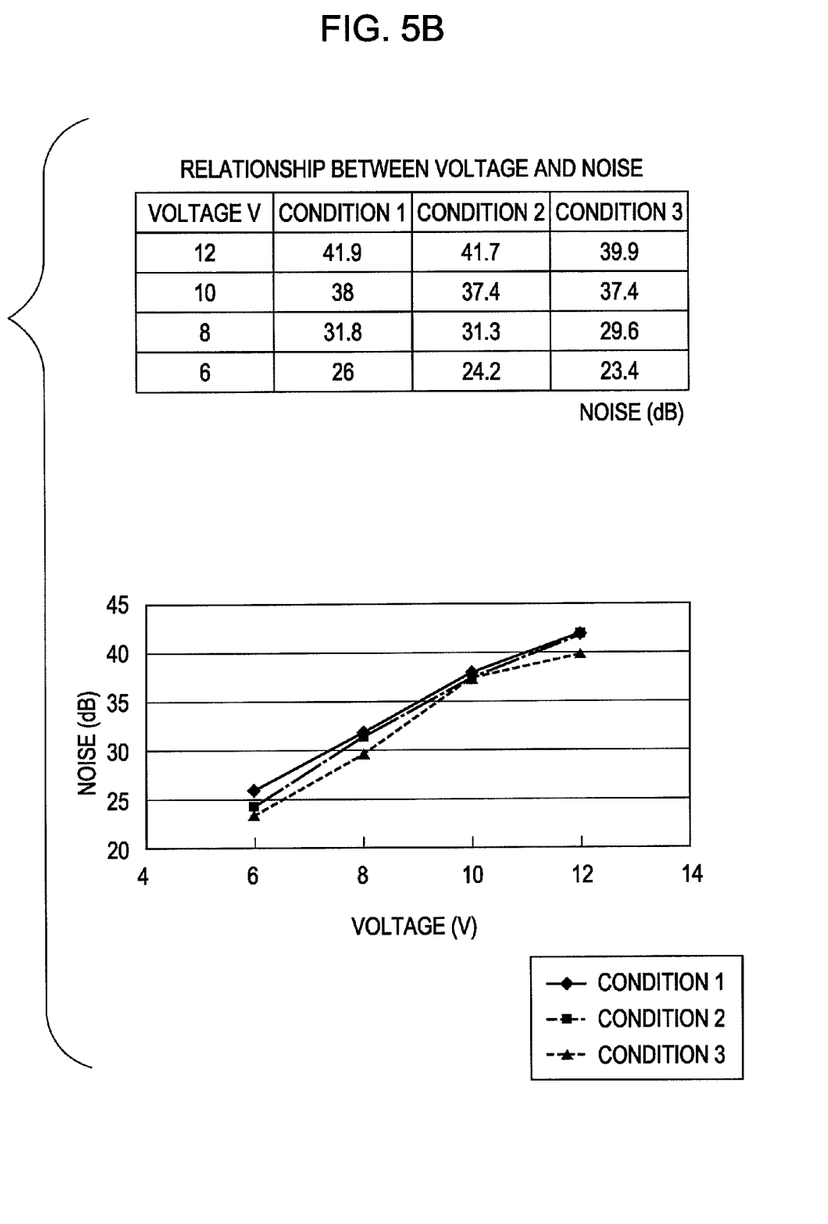
Figure 5C:
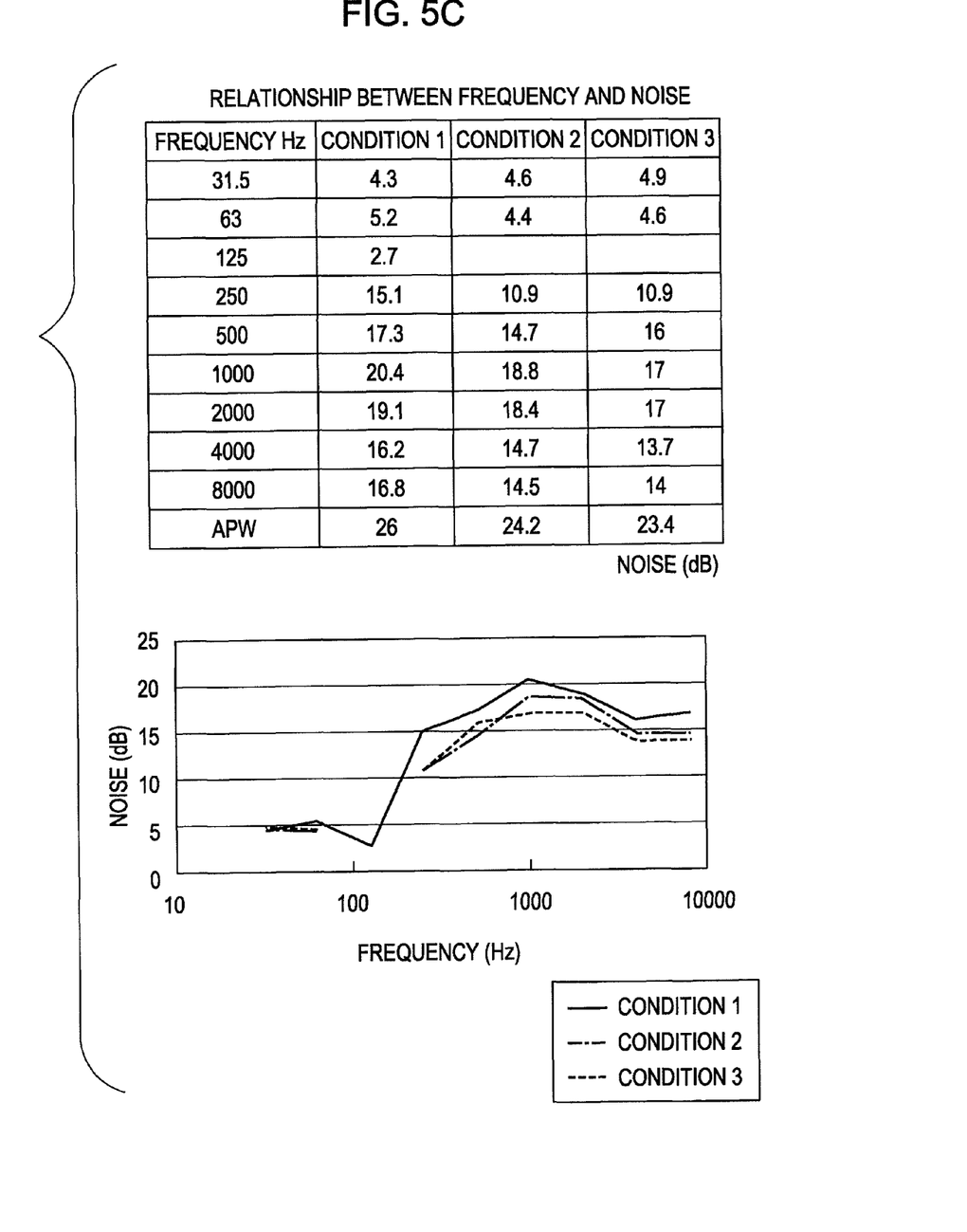

FIGS. 5A to 5C are diagrams illustrating an example of the result of noise measurement.

Referring to FIG. 5A, noise measurement was performed by arranging two exhaust fans 33 next to each other such that the airflow exit sides thereof were covered with the louver 34 and placing a microphone 40 at the airflow exit side of the louver 34. For comparison, the noise measurement was also performed for the case in which a louver having inclined plate portions which are inclined in the same inclination direction over the entire area thereof was used (hereinafter referred to as "condition 1") and the case in which no louver was provided (hereinafter referred to as "condition 3") in addition to the above-described case in which the louver 34 was used (hereinafter referred to as "condition 2").

FIG. 5B shows an example of the relationship between the voltage (V) applied to the exhaust fans 33 and the magnitude (dB) of noise measured by the microphone 40. It is clear from FIG. 5B that the magnitude of noise largely differs between conditions 1 and 2 when the voltage is low.

FIG. 5C shows an example of the relationship between the magnitude (dB) of noise measured by the microphone 40 and the frequency (Hz) of the noise in the case where a predetermined voltage (for example, 6V) is applied to the exhaust fans 33. It is clear from FIG. 5C that the magnitude of noise largely differs between conditions 1 and 2 particularly in a high-frequency range.

Thus, it is clear from the result of the noise measurement shown in FIGS. 5B and 5C that the air cooling unit 3 including the louver 34 having the above-described structure definitely provides a noise-reducing effect compared to the case in which the louver with the uniform inclination direction is used.

Thus, in the air cooling unit 3 including the louver 34 having the above-described structure, the inclination direction of the inclined plate portions 34a matches the rotational direction of the blades of each exhaust fan 33 in each of the areas 35a and 35b of the louver 34. As a result, the noise reducing effect can be obtained.

To match the inclination direction with the direction of the airflow, the plane area of the louver 34 is divided into the first area 35a and the second area 35b for each exhaust fan 33 along the boundary line which passes through the axial center of the blades of the exhaust fan 33. Therefore, the plane area is simply divided into two areas, for example, into left and right areas or upper and lower areas across the boundary line. Thus, the number of areas into which the plane area is divided can be prevented from being excessively increased.

Therefore, compared to the case in which exhaust-straightening walls are arranged in a pattern of concentric circles or in a radial pattern with respect to the rotational center of each exhaust fan 33, the shape of the louver 34, more particularly, the shape of the inclined plate portions 34a in the areas 35a and 35b is simple. Thus, the shape of the louver 34 is prevented from being more complex than necessary, and the louver 34 can be easily formed.

In addition, the external shape of the louver 34 is less complex compared to the case in which the exhaust-straightening walls are arranged in a pattern of concentric circles or in a radial pattern with respect to the rotational center of each exhaust fan 33. As a result, there is more freedom and versatility in the design of the external shape.

In particular, the structure in which the louver 34 has not only the inclined plate portions 34a but also the non-inclined plate portions 34b as in the present embodiment is extremely advantageous in increasing the freedom and versatility in the design of the external shape. In the case where the louver 34 is structured such that the non-inclined plate portions 34b are connected to the ends of the inclined plate portions 34a at the airflow exit side thereof, the non-inclined plate portions 34b are exposed at the outer side of the housing 1. The non-inclined plate portions 34b are not inclined with respect to the rotational axis direction of each exhaust fan 33 in either of the first area 35a and the second area 35b. Therefore, if the non-inclined plate portions 34b are exposed at the outer side, the external appearance of the louver 34 does not differ between the first area 35a and the second area 35b. Thus, even though the inclination direction of the inclined plate portions 34a differs between the first area 35a and the second area 35b, the difference is indiscernible from the outside. Therefore, although the inclination direction of the inclined plate portions 34a differs between the first area 35a and the second area 35b, since the non-inclined plate portion 34b are disposed at the airflow exit side, the freedom and versatility in the design of the external shape can be ensured.

In addition, since the inclined plate portions 34a and the non-inclined plate portions 34b are connected to each other, the slats including the inclined plate portions 34a and the non-inclined plate portions 34b have bent portions. Therefore, compared to the case in which, for example, the slats are flat plate shaped, the strength (rigidity) of the slats can be extremely easily ensured.

As described above, freedom and versatility in the design of the external shape can be ensured by connecting the inclined plate portions 34a and the non-inclined plate portions 34b to each other. In addition, since the inclined plate portions 34a function as light-blocking plates, the leakage of light emitted by the light source 11 from the housing 1 can be prevented.

In addition, if the intervals between the non-inclined plate portions 34b are in the range of 3 mm to 5 mm as described in the present embodiment, the louver 34 can function as the exhaust outlet without blocking the airflow and the foreign matter can be effectively prevented from entering the housing 1.

In addition, if the inclination angle of the inclined plate portions 34a is set in the range of 30° to 45° as in the present embodiment, the louver 34 can be easily formed and the resistance to the airflow caused by the louver 34 can be reduced. In addition, the leakage of light emitted by the light source 11 from the housing 1 can be effectively prevented.

The inclination angle of the inclined plate portions 34a, the dimensions of the inclined plate portions 34a and the non-inclined plate portions 34b in the rotational axis direction of each exhaust fan 33, and the intervals between the slats arranged in the direction perpendicular to the rotational axis direction may be set as described in the present embodiment. In such a case, the leakage of light emitted by the light source 11 from the housing 1 can be reliably prevented.

The cooling structure according to the present embodiment of the present embodiment is suitable for use in a liquid crystal projector apparatus including the light source 11 in the housing 1.

Although a preferred example of the present invention is described in the present embodiment, the present invention is not limited to the present embodiment.

For example, although the liquid crystal projector apparatus is explained as an example of the projection display apparatus in the present embodiment, the present invention can also be similarly applied to other types of projection display apparatuses, such as an apparatus including a modulation device other than the liquid crystal panels, as long as the inside of the housing is cooled.

The present application contains subject matter related to that disclosed in Japanese Priority Patent Application JP 2008-296513 filed in the Japan Patent Office on Nov. 20, 2008, the entire content of which is hereby incorporated by reference.

It should be understood by those skilled in the art that the present invention is not limited to the structure described in the present embodiment, and various modifications, combinations, sub-combinations and alterations may occur depending on design requirements and other factors insofar as they are within the scope of the appended claims or the equivalents thereof.

What is claimed is:

1. A projection display apparatus comprising:
an axial fan including blades which are rotated to generate an airflow in an axial direction so that air is exhausted from a housing; and
a louver including inclined plate portions which are inclined with respect to the axial direction, the inclined plate portions being arranged in a direction perpendicular to the axial direction at an airflow exit side of the axial fan, the louver being divided into a first area and a second area by a straight line which passes through an axial center of the blades, the inclined plate portions being inclined in different directions between the first area and the second area such that the inclined plate portions are inclined along the direction in which the blades are rotated, wherein the louver includes non-inclined plate portions, which are not inclined with respect to the axial direction, the non-inclined plate portions being connected to ends of the inclined plate portions at an airflow exit side of the inclined plate portions, wherein the inclined plate portions and non-inclined plate portions are connected to each other such that the inclined plate portions are positioned near the axial fan and the non-inclined plate portions are positioned near the outside of the housing.

2. The projection display apparatus according to claim 1, wherein intervals between the non-inclined plate portions arranged in the direction perpendicular to the axial direction are in the range of 3 mm to 5 mm.

3. The projection display apparatus according to claim 1, wherein an inclination angle of the inclined plate portions with respect to the axial direction is in the range of 30 degrees to 45 degrees.

4. The projection display apparatus according to claim 1, wherein an inclination angle of the inclined plate portions, a dimension of the inclined plate portions in the axial direction, and a pitch at which the inclined plate portions are arranged in the direction perpendicular to the axial direction are set so as to prevent leakage of light emitted by a light source disposed in the housing.

* * * * *